United States Patent
Raasch

(10) Patent No.: US 6,262,716 B1
(45) Date of Patent: *Jul. 17, 2001

(54) INFORMATION PROCESSING APPARATUS HAVING A NUMERIC KEYPAD WITH COVER THAT FUNCTIONS AS A PALM REST

(75) Inventor: Lisa Ann Raasch, Sioux City, IA (US)

(73) Assignee: Gateway, Inc., N. Sioux City, SD (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,495

(22) Filed: Jul. 1, 1998

(51) Int. Cl.[7] .............................. G09G 5/00; H03K 17/94; B68G 5/00; H05K 5/00
(52) U.S. Cl. .......................... 345/168; 341/22; 248/118; 248/918; 361/680
(58) Field of Search ................... 345/168; 364/708.1; 361/680, 681, 682, 683; 341/20, 21, 22; 400/715; 108/50.14, 93; 705/25; D14/115, 115.1; 200/333; 248/918, 118, 118.1, 118.3, 118.5

(56) References Cited

U.S. PATENT DOCUMENTS

| | | | |
|---|---|---|---|
| D. 365,335 | 12/1995 | Busch et al. ................... | D14/106 |
| D. 417,449 * | 12/1999 | Harris et al. .................. | D14/138 |
| 4,553,216 | 11/1985 | Stevens et al. ................ | 364/558 |
| 4,604,605 * | 8/1986 | Meyers et al. ................. | 200/333 |
| 5,187,644 | 2/1993 | Crisan .......................... | 361/393 |
| 5,278,958 | 1/1994 | Dewa ........................... | 395/275 |
| 5,341,154 * | 8/1994 | Bird ............................ | 345/168 |
| 5,346,164 * | 9/1994 | Allen ........................... | 248/118 |
| 5,402,121 | 3/1995 | Noorbehesht .................. | 341/26 |
| 5,428,355 * | 6/1995 | Jondrow et al. ................ | 341/20 |
| 5,457,480 * | 10/1995 | White ........................... | 345/168 |
| 5,596,481 * | 1/1997 | Liu et al. ....................... | 361/683 |
| 5,596,482 * | 1/1997 | Horikoshi ...................... | 361/683 |
| 5,612,690 | 3/1997 | Levy ............................ | 341/22 |
| 5,655,743 * | 8/1997 | Gillis ........................... | 248/918 |
| 5,657,258 * | 8/1997 | Grewe et al. .................. | 361/681 |
| 5,675,360 | 10/1997 | Takegoshi et al. .............. | 345/167 |
| 5,755,410 * | 5/1998 | Ambrose et al. ................ | 248/118 |
| 5,771,814 * | 6/1998 | Clausen ........................ | 108/93 |
| 6,025,986 * | 2/2000 | Sternglass et al. .............. | 361/680 |

* cited by examiner

Primary Examiner—Steven Saras
Assistant Examiner—Paul A. Bell
(74) Attorney, Agent, or Firm—Suiter & Associates PC; Kenneth J. Cool; Kevin E. West

(57) ABSTRACT

A keypad assembly for an information processing apparatus such as a portable computer or the like is disclosed. The keypad assembly comprises a keypad disposed in the housing of the information processing apparatus and a cover for covering the keypad and providing a palm rest for the user. The cover is movable between a closed position wherein the keypad is at least partially enclosed by the cover and an opened position wherein the keypad is accessible by a user of the information processing apparatus.

16 Claims, 3 Drawing Sheets

INFORMATION PROCESSING APPARATUS HAVING A NUMERIC KEYPAD WITH COVER THAT FUNCTIONS AS A PALM REST

FIELD OF THE INVENTION

The present invention relates generally to information processing apparatus and more specifically to an information processing apparatus such as portable computer or the like having a numeric keypad assembly.

BACKGROUND OF THE INVENTION

Portable computers have become increasingly popular of late due to the many advantages they provide in mobility and versatility over conventional desk top computer systems. These computers, often referred to as notebook or laptop computers, typically comprise a clam-shell type housing including a main body portion providing a keyboard, and a lid portion having a built-in display wherein the main body portion and lid portion may be folded together so that the computer may be carried from place to place by a user.

Because light weight and small size are important considerations to most users, portable computers typically have keyboards which are smaller than the keyboards commonly used with conventional desktop computers. These keyboards usually provide fewer keys (e.g., only 82 or 83 keys) than their conventional "full size" counterparts (e.g., 101 or 102 keys). As a result, some keys must be "embedded" in the keyboard such that they are available only after a designated control key is depressed or activated. Most often, these embedded keys correspond to the numeric keypad of the full size keyboard and are enabled when the user depresses a "Num Lock" key on the keyboard of the portable computer.

While keyboards having a numeric keypad embedded therein do provide access to numeric keys arranged in an approximate keypad configuration, many users of portable computers would prefer to have a separate numeric keypad which can be used simultaneously with the alphanumeric and function keys of the keyboard. For example, a non-embedded keypad is particularly desirable for use with software programs requiring extensive number entry such as, for example, programs providing accounting, mathematical, or spreadsheet applications. However, positioning a numeric keypad to the side of the already cramped keyboard of a portable computer would require the keyboard surface to be made wider, thereby increasing the size and weight of the computer.

Many portable computers have an area immediately beneath their keyboard, as viewed by the user of the computer, on which the user may rest the palms of his or her hands while typing. Positioning a keypad in this area would provide optimal use of the keypad for entering numeric information into the computer. However, positioning the keypad in this area would also interfere with use of the keyboard by the user since the user would be unable to rest one of his or her hands in the area of the keypad while typing.

Consequently, it would be advantageous to provide a keypad assembly for a portable computer, or the like, wherein the keypad assembly includes an integral keypad for entering information into the computer and a cover for covering the keypad when it is not being used. Preferably, the cover would provide a palm rest on which the user may rest one of his or her hands while entering information via the keyboard.

SUMMARY OF THE INVENTION

Accordingly, the present invention provides a novel information processing apparatus having a keyboard for entering information and commands therein and a keypad assembly positioned adjacent to the keyboard. The keypad assembly includes a keypad disposed in the housing of the information processing apparatus and a cover for covering the keypad and providing a palm rest for the user. The cover is movable between a closed position wherein the cover at least partially covers the keypad and an open position wherein the keypad is accessible by a user of the information processing apparatus. The cover may comprise a curved upper surface providing a support on which the user may rest one of his or her hands while entering information via the keyboard or keypad.

It is to be understood that both the foregoing general description and the following detailed description are exemplary and explanatory only and are not restrictive of the invention claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiments of the invention, example of which are illustrated in the accompanying drawings.

Figure 1A:
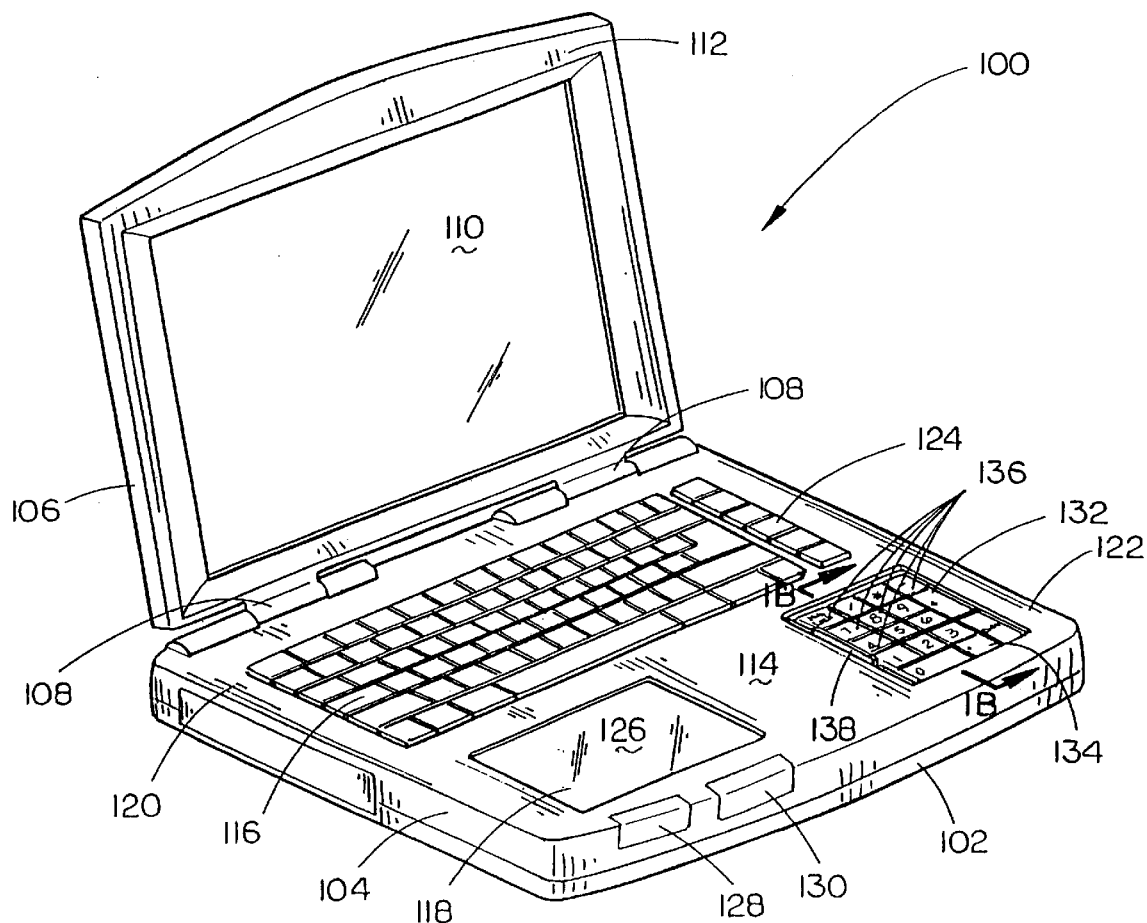
FIG. 1A is a perspective view depicting an information processing apparatus employing a keypad assembly according to an exemplary embodiment of the present invention.

Referring now to FIG. 1A, an information processing apparatus employing a keypad assembly according to an exemplary embodiment of the present invention is shown. The information processing apparatus 100 may be, for example, a portable computer such as a laptop or notebook computer, or alternatively, may be a personal organizer, personal digital assistant, portable data terminal, or similar device. The information processing apparatus 100 may have a clam-shell type housing 102 including a main body portion 104 and a lid portion 106 rotatively joined together by hinges 108. The information processing apparatus 100 preferably includes a processor such as a microprocessor, microcontroller or the like for executing programs, performing data manipulations and controlling the tasks of the computer and memory providing storage of instructions and data for programs executed by the processor.

While in use, as shown in FIG. 1A, the lid portion 106 may be opened to an upright position with respect to the main body portion 104 by rotating the lid portion 106 about the hinges 108. In the opened position, a display 110 occupying a substantial area of the inner face 112 of the lid portion 106, may be viewed by a user. Preferably, the main body portion 104 and the lid portion 106 may be folded together about the hinges 108, when not in use. In this manner, the information processing apparatus 100 may be made more compact so as to be more easily carried from place to place by a user.

The main body portion 104 comprises an upper face 114 having a keyboard 116 and pointing device 118 for entering information and commands into the information processing apparatus 100. The keyboard 116 may occupy the top half 120 of the upper face 114, as viewed by a user of the information processing apparatus 100, so that the bottom half 122 of the upper face 114 may be utilized by the user as a palm rest or support for his or her hands while entering information via the keyboard 116. The keyboard 116 is preferably an alphanumeric keyboard of the type commonly utilized by portable computers having a plurality of keys, typically 82 or 83 keys, including alphanumeric keys, punctuation keys, shift keys, an enter key, a tab key, and a space bar arranged in a standard "QWERTY" format. The keyboard 116 may also include one or more function keys 124, positioned in rows or columns adjacent to the alphanumeric keys. The function keys 124 may be assigned software specific functions by software programs being executed by the information processing apparatus 100.

The pointing device 118 may be positioned beneath the keyboard 116 in the bottom half 122 of the upper face 114, as viewed by the user of the information processing apparatus 100. The pointing device 118 may be a trackpad type pointing device which comprises a touch sensitive surface 126 and left and right depressable pushbutton keys 128 & 130 corresponding to the left and right buttons of the standard mouse type pointing device commonly used with full sized conventional computers. The touch sensitive surface 126 allows a user to control the position and movement of a cursor or pointer displayed on the display 110 by touching a corresponding position on the surface 126 with his or her fingertip or a stylus. The user may then enter commands based on the location of the cursor by depressing one or both of the keys 128 & 130. For example, a user may highlight text in a word processing program, select a group of cells in a spreadsheet program or pull down a menu in an operating system graphical user interface by moving the cursor and selecting options displayed on the display 110. Alternatively, the pointing device utilized by the computer may be a trackball type pointing device, trackstick type pointing device, or the like.

As shown in FIG. 1A, a keypad assembly 132 is disposed in the upper face 114 of the main body portion 104. The keypad assembly 132 may be positioned in the bottom half 122 of the upper face 114 immediately adjacent to and below the keyboard 116 as viewed by a user of the information processing apparatus 100. Preferably, the keypad assembly 132 comprises a keypad 134 having a plurality of keys 136 for entering information and/or commands into the information processing apparatus 100. Preferably, the keypad 134 may be a standard numeric keypad having keys corresponding to the numerals A0" through A9", a decimal point, basic arithmetic operands, and the like. Alternatively, the keypad 134 may be a standard telephone keypad or may provide additional function keys, alphanumeric keys, or the like. A cover or door 138 may be provided for covering the keypad 134. The cover 138 is preferably movable between a closed position wherein the keypad 134 is at least partially enclosed by the cover 138, and an open position wherein the keypad 134 is uncovered so as to be accessible by the user of the information processing apparatus 100. Preferably, the cover 138, when in the closed position, provides a surface on which the user may rest one of his or her hands while entering information via the keyboard 116.

Figure 1B:
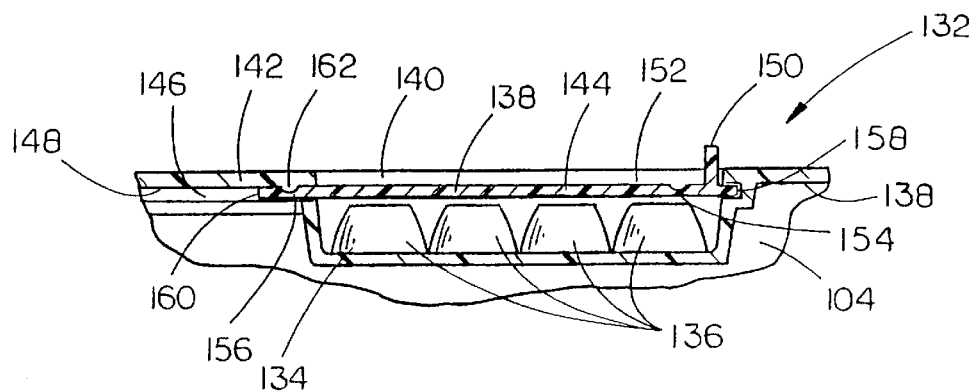
FIG. 1B is a cross-sectional side elevational view of the keypad assembly shown in FIG. 1A.

Referring now to FIG. 1B, a cross-sectional view of the keypad assembly illustrated in FIG. 1A is shown. The keypad assembly 132 may be recessed within an aperture 140 in an upper wall 142 of the main body portion 104 so that the keys 136 of the keypad 134 are enclosed by the cover 138 when it is in the closed position (shown). The cover 138 preferably comprises a generally rectangular flat plate having opposed perimeter edges 144 which slidably engage C-shaped channels 146 extending from a lower surface 148 of the upper wall 142 along either side of the keypad 134. The cover 138 may slide within these channels 146 between a fully closed position (shown), wherein the keypad 134 is completely covered, and a fully opened position (see FIG. 1A), wherein the keypad 134 is uncovered and may be accessed by a user. A tab 150 may extend upwardly from an upper face 152 of the cover 138. The user may grasp the tab 150 to move the cover 138 between the closed and opened positions. Notches 154 & 156 may be provided in the upper face 152 of the cover 138 along its forward edge 158, adjacent to the tab 150, and along its rear edge 160, respectively. A ridge 162 consisting of a raised area formed on the lower face 148 of the upper wall 142 may engage either of these notches 154 & 156 to alternately hold the cover 138 in the opened or closed positions (i.e., the ridge 162 may engage notch 154 to hold the cover 138 in the opened position, and notch 156 to hold the cover 138 in the closed position). The user, by pressing against the tab 150, may provide sufficient force to disengage the ridge 162 from a notch 154 & 156 so that the cover 138 may slide within the channels 146 to be moved between the opened and closed positions.

Turning now to FIGS. 2A through 4B, alternative embodiments of the keypad assembly are shown. Preferably, in each embodiment, the keypad assembly 200, 300 & 400, like the keypad assembly 132 according to the embodiment shown in FIGS. 1A and 1B, is positioned in the bottom half of the upper face of the main body portion of the computer's housing adjacent to and beneath the keyboard as viewed by a user of the computer (see FIG. 1A). The keypad 202, 302 & 402 of each keypad assembly 200, 300 & 400 may be recessed within an aperture in the upper wall of the main body portion of the computer's housing so that the keypad may be enclosed by a cover 204, 304 & 404 when it is not being used.

Figure 2A:
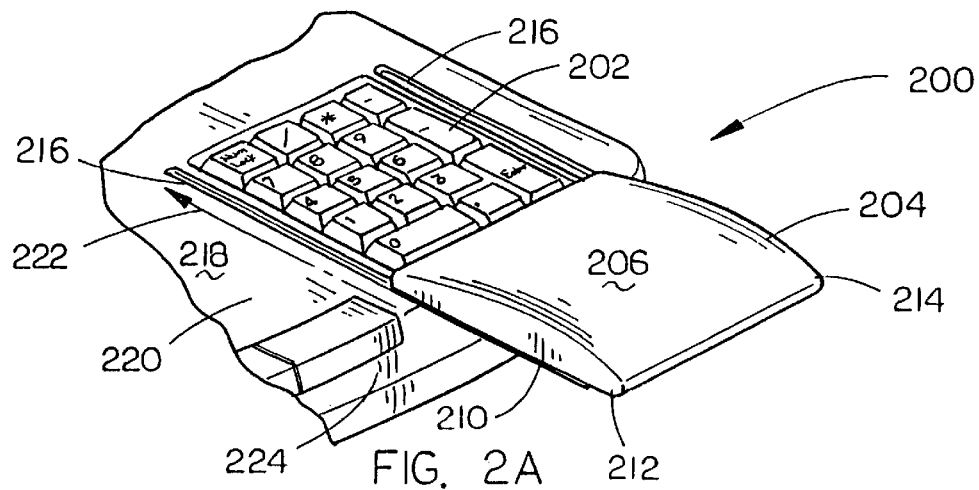
FIG. 2A is a partial perspective view depicting a keypad assembly according to an alternative embodiment of the present invention wherein the sliding cover assembly includes an arcuate or curved upper surface.
Figure 2B:
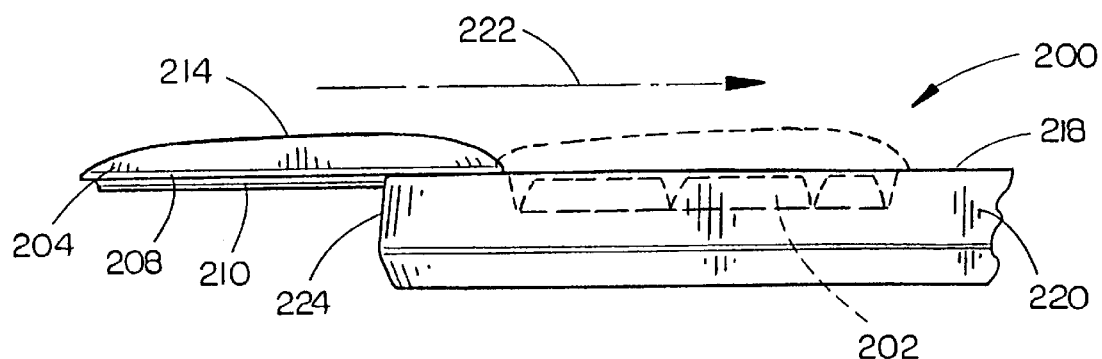
FIG. 2B is a cross-sectional side elevational view of the keypad assembly shown in FIG. 2A.

As shown in FIGS. 2A and 2B, the keypad assembly 200 may comprise a rectangular cover 204 having a curved upper surface 206 and a lower surface 208 shaped to cover the keypad 202. A rail or slide 210 may extend downward from the lower surface 208 of the cover 204 along each of two distal perimeter edges 212 & 214. These rails 210 may slidably engage channels 216 recessed in the upper face 218 of the housing 220 along opposed sides of the keypad 202 so that the cover 204 may slide between a fully closed position, wherein the keypad 202 is completely enclosed by the cover 204, and a fully opened position, wherein the keypad 202 is uncovered and may be accessed by a user. The cover 204 is shown in the fully opened position in FIGS. 2A and 2B. The user may move the cover 204 from the fully opened position to the fully closed position by applying a force against the cover 204 in the direction of arrow 222. Similarly, when the cover 204 is in a fully closed or partially closed position, the user may apply a force in the opposite direction of arrow 222 to move the cover 204 to the fully opened position.

Preferably, when the cover 204 is in the closed position, its upper surface 206 provides a support on which the user may rest one of his or her hands while entering information via the keyboard. Similarly, when the cover 204 is in the opened position (shown), it may extend over the lower end 224 of the computer's housing 220 so that its upper surface 206 may provide a support on which the user may rest one of his or her hands while entering information via the keypad 202. The upper surface 208 may be formed from a resilient material such as rubber, plastic, foam, or the like to provide additional comfort to the user.

Figure 3A:
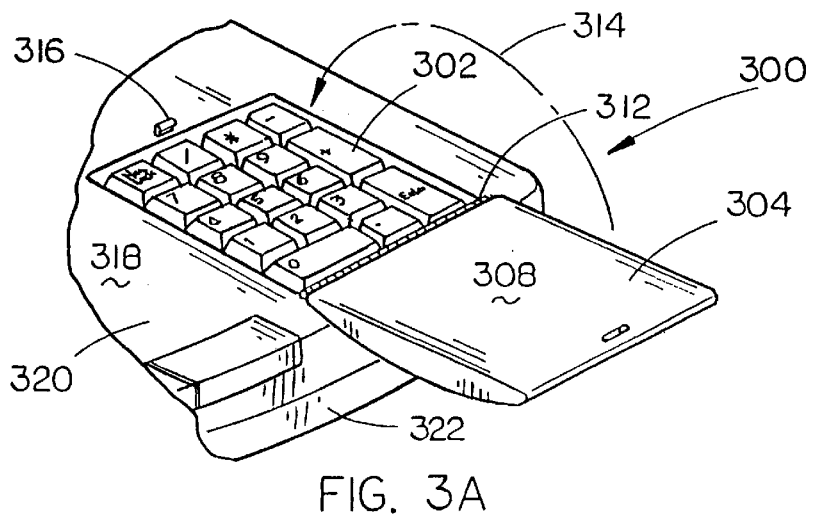
FIG. 3A is a partial perspective view depicting a keypad assembly according to an alternative embodiment of the present invention wherein the cover assembly is hinged to the housing of the information processing apparatus.
Figure 3B:
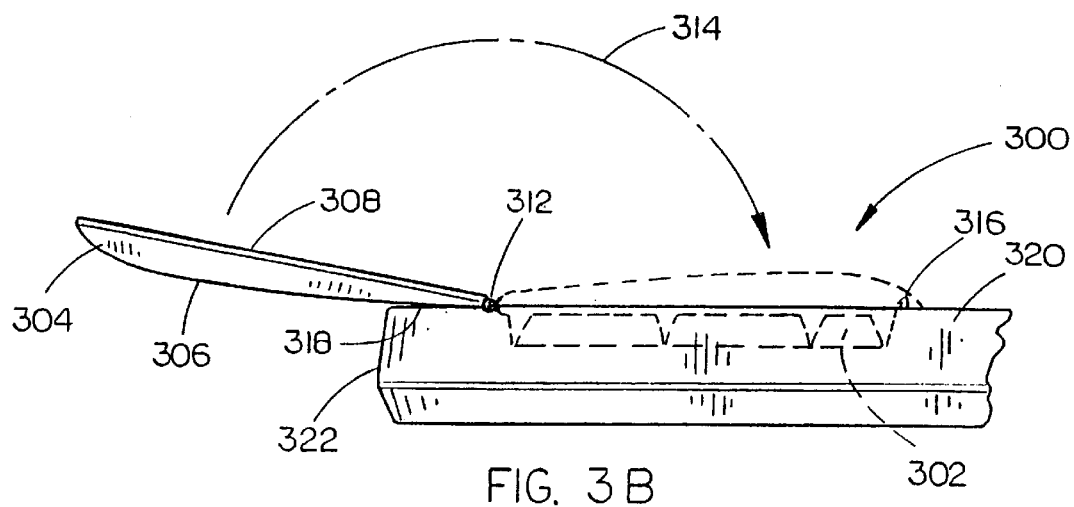
FIG. 3B is a cross-sectional side elevational view of the keypad assembly shown in FIG. 3A.

Turning now to FIGS. 3A and 3B, an alternative embodiment of the keypad assembly is shown. This keypad assembly 300 may comprise a rectangular cover 304 having a curved upper surface 306 and a generally flat lower surface 308. The cover 304 may be hinged to the computer's housing 310 via a hinge 312. Preferably, the cover 304 may rotate about the hinge 312 through an arc represented by arrow 314 between a fully closed position, wherein the keypad 302 is completely covered, and a fully opened position, wherein the keypad 302 is uncovered and may be accessed by a user. A latch assembly 316 may be provided to hold the cover 304 in the closed position when the keypad 302 is not being used.

Preferably, when the coverers is in the closed position, the upper surface 306 provides additional support for the palm area of a user's hand while the user is entering information into the information processing apparatus via the keyboard. When the cover 304 is in the opened position (shown), the upper surface 306 of the cover 304 is inverted and may rest against the upper face 318 of the computer's housing 320. This allows the cover 304 to extend over the lower end 322 of the computer's housing 320 so that to the lower surface 308 of the cover 304 is facing upward. In this manner, the lower surface 308 of the cover 304 may provide a support on which the user may rest one of his or her hands while entering information via the keypad 302. The upper and lower surfaces 306 & 308 of the cover may be formed from a resilient material such as rubber, plastic, foam, or the like to provide additional comfort to the user.

Figure 4A:
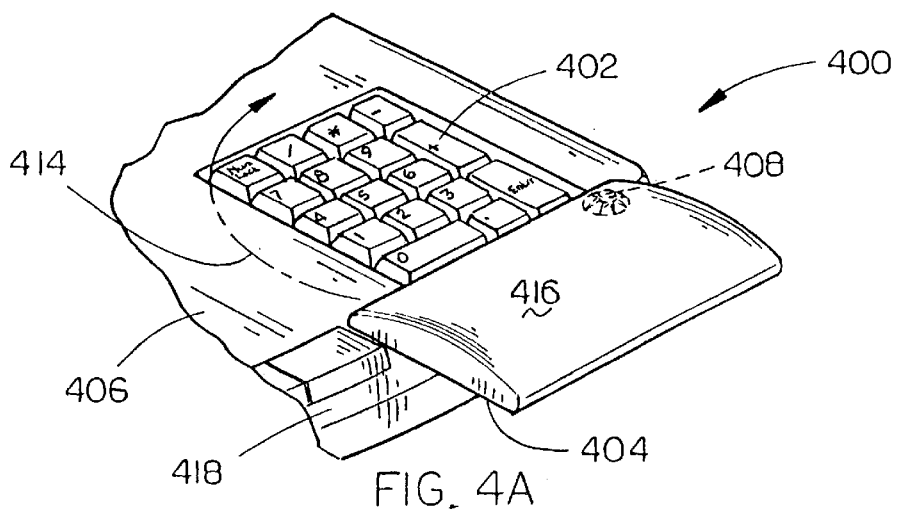
FIG. 4A is a partial perspective view depicting a keypad assembly according to an alternative embodiment of the present invention wherein the cover assembly is pivoted to the housing of the information processing apparatus.
Figure 4B:
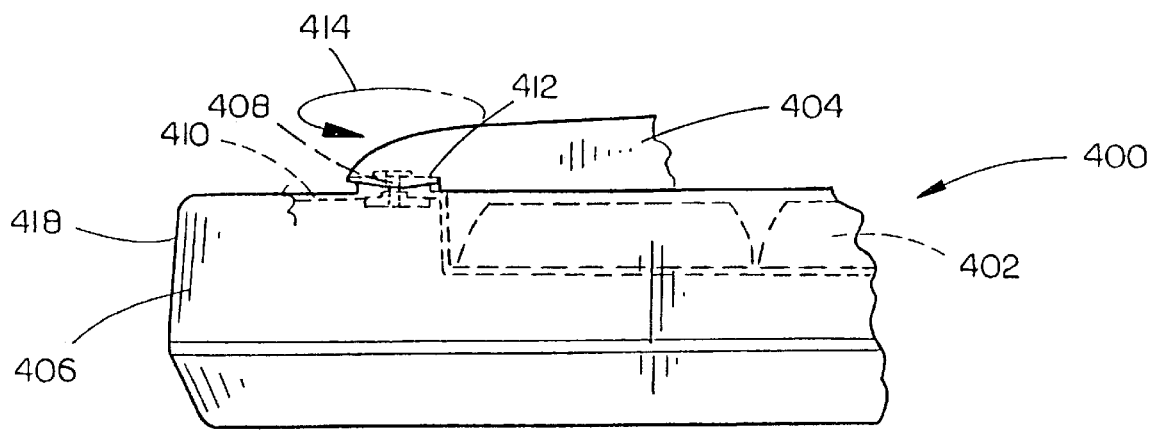
FIG. 4B is a cross-sectional side elevational view of the keypad assembly shown in FIG. 4A.

Turning now to FIGS. 4A and 4B, the cover 404 of the keypad assembly 400 may be pivotally mounted to the computer's housing 406 via a pivot post 408. As shown in FIG. 4B, the pivot post 408 may extend through an upper wall 410 of the housing 406 and a lower wall 412 of the cover 404 to secure the cover 404 to the housing 406. Preferably, the cover 404 may rotate about the pivot post 408 through an arc represented by arrow 414 between a fully closed position, wherein the keypad 402 is completely enclosed by the cover 404, and a fully opened position, wherein the keypad 402 is uncovered and may be accessed by a user.

The cover 404 may have a curved upper surface 416. Preferably, when the cover 404 is in the closed position, this upper surface 416 provides a support on which the user may rest one of his or her hands while entering information via the keyboard (see FIG. 1A). Similarly, when the cover 404 is in the opened position (shown), it may extend over the lower end 418 of the computer's housing 406 so that the upper surface 416 may provide a support on which the user may rest one of his or her hands while entering information via the keypad 402. The upper surface 416 may be formed from a resilient material such as rubber, plastic, foam, or the like to provide additional comfort to the user.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The forms herein before described being merely explanatory embodiments thereof, it is the intention of the following claims to encompass and include such changes.

What is claimed is:

1. An information processing apparatus, comprising:

a housing having a keyboard surface;

a keyboard disposed in said keyboard surface of said housing, said keyboard including a first plurality of keys for entering information into the information processing apparatus;

a keypad disposed in said keyboard surface of said housing below said keyboard, said keypad including a second plurality of keys for entering information into the information processing apparatus; and a cover cooperating with said housing for covering said keypad, said cover being movable between a closed position wherein said keypad is at least partially covered by said cover and an open position wherein said keypad is accessible by a user of the information processing apparatus;

wherein said cover forms at least part of a palm rest for said keyboard when said cover is in the closed position, said palm rest being suitable for supporting the palm areas of both of the user's hands for typing on said first plurality of keys.

2. The information processing apparatus of claim 1, wherein said cover slidably engages said housing so that said cover may slide between said opened position and said closed position.

3. The information processing apparatus of claim 2, wherein said cover forms a palm support for said keypad when said cover is in the open position, said palm support being suitable for supporting the palm of at least one of the user's hands for entering information via said keypad.

4. The information processing apparatus of claim 1, wherein said cover is hinged to said housing via a hinge so that said cover may rotate about said hinge between said opened position and said closed position.

5. The information processing apparatus of claim 1, wherein said cover is pivotally mounted to said housing so that said cover may pivot through a plane generally parallel to said keyboard surface between said opened position and said closed position.

6. The information processing apparatus of claim 1, wherein said cover comprises a curved upper surface for at least partially supporting the palm area of a user's hand.

7. The information processing apparatus of claim 6, wherein said curved upper surface is formed of a resilient material.

8. The information processing apparatus of claim 1, further comprising a pointing device disposed on said housing adjacent to said keypad, said pointing device for inputting commands into said information processing apparatus.

9. A keypad assembly for an information processing apparatus having a keyboard surface and a keyboard disposed in said keyboard surface for entering information into said information processing apparatus, said keypad assembly comprising:

a plurality of keys disposed in said keyboard surface so as to be positioned below said keyboard on said keyboard surface, said plurality of keys for entering information into said information processing apparatus; and a cover cooperating with said housing for covering said plurality of keys, said cover being movable between a closed position wherein said cover at least partially encloses said plurality of keys and provides a palm rest for said keyboard and an open position wherein said plurality of keys is accessible by a user of the information processing apparatus and said cover provides a palm support for said keypad.

10. The keypad assembly of claim 9, wherein said cover comprises rails slidably engaging channels disposed is said housing so that said cover mat slide between said opened position and said closed position.

11. The keypad assembly of claim 9 wherein said cover is hinged to said housing via a hinge so that said cover may rotate about said hinge between said opened position and said closed position.

12. The information processing apparatus of claim 9, wherein said cover is pivotally mounted to said housing so that said cover may pivot between said opened position and said closed position through plane generally parallel to said keyboard.

13. The information processing apparatus of claim 9, wherein said cover comprises a curved upper surface for at least partially supporting a user's hand.

14. The information processing apparatus of claim 13, wherein said curved upper surface is formed of a resilient material.

15. A portable computer, comprising:

a housing having a keyboard surface;

a keyboard disposed in said keyboard surface of said housing, said keyboard including a first plurality of keys for entering information into the portable computer;

a palm rest area disposed in said keyboard surface below said keyboard suitable for supporting the palm areas of the user's hands for typing on said keyboard;

a keypad disposed within said housing in said palm rest area, said keypad including a second plurality of keys for entering information into the portable computer; and a cover cooperating with said housing for covering said keypad;

wherein said cover is movable between a closed position wherein said keypad is at lease partially covered by said cover and an open position wherein said keypad is accessible by a user of the portable computer.

16. The portable computer of claim 15, wherein said cover forms a palm support for said keypad when said cover is in the open position, said palm support being suitable for supporting the palm area of at least one of the user's hands for entering information via said keyboard.

* * * * *